(12) United States Patent
Akagi et al.

(10) Patent No.: US 6,612,954 B2
(45) Date of Patent: Sep. 2, 2003

(54) BELT FOR CONTINUOUSLY VARIABLE TRANSMISSION

(75) Inventors: Hirofumi Akagi, Saitama (JP); Hideaki Yoshida, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/925,623

(22) Filed: Aug. 10, 2001

(65) Prior Publication Data

US 2002/0025873 A1 Feb. 28, 2002

(30) Foreign Application Priority Data

Aug. 11, 2000 (JP) .......................................... 2000-245019

(51) Int. Cl.[7] .............................................. F16G 5/16
(52) U.S. Cl. ...................................... 474/242; 474/237
(58) Field of Search ............................ 474/201, 237, 474/238, 242, 243, 245

(56) References Cited

U.S. PATENT DOCUMENTS

| | | | |
|---|---|---|---|
| 4,465,469 A | * | 8/1984 | Cataldo .................... 474/201 |
| 4,619,634 A | | 10/1986 | Nakawaki .................. 474/201 |
| 4,824,424 A | * | 4/1989 | Ide et al. ................... 474/201 |
| 5,346,440 A | * | 9/1994 | Smeets ...................... 474/242 |
| 6,090,004 A | * | 7/2000 | Kanehara et al. ........... 474/201 |
| 6,217,471 B1 | * | 4/2001 | Brandsma et al. .......... 474/201 |

FOREIGN PATENT DOCUMENTS

| | | |
|---|---|---|
| EP | 1 111 271 A1 | 6/2001 |
| JP | 57-23820 | 5/1982 |
| JP | 3-1537 | 1/1991 |
| JP | 5-48364 | 7/1993 |

OTHER PUBLICATIONS

Patent Abstracts of Japan, vol. 2000, No. 13, Feb. 5, 2001 & JP 2000 297848, Oct. 24, 2000.
Patent Abstracts of Japan, vol. 007, No. 110, (M–214), May 13, 1983 & JP 58 030549, Feb. 23, 1983.

* cited by examiner

Primary Examiner—Thomas R. Hannon
Assistant Examiner—Vicky A. Johnson
(74) Attorney, Agent, or Firm—Arent Fox Kintner Plotkin & Kahn

(57) ABSTRACT

A belt for a continuously variable transmission includes a metal ring assembly formed of a plurality of endless metal rings laminated one on another, and a large number of metal elements each having a ring slot into which the metal ring assembly is fitted. In the belt, a crowning radius of the metal ring in a free state is set smaller than a crowning radius of a saddle face of the ring slot supporting the innermost metal ring. Thus, the metal ring assembly can be centered to a central portion of the saddle face, whereby a difference between a tensile stress at a central portion of an outer peripheral surface of the metal ring and a tensile stress at opposite ends of the outer peripheral surface can be reduced in an area where the metal belt is wound around a pulley, thereby preventing a reduction in durability.

1 Claim, 6 Drawing Sheets

FIG.2
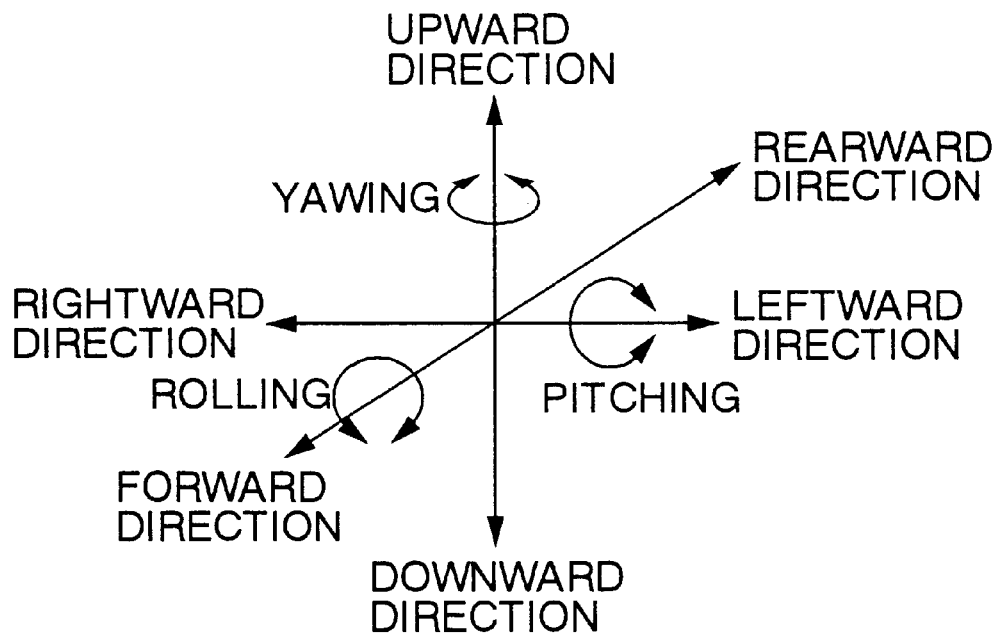
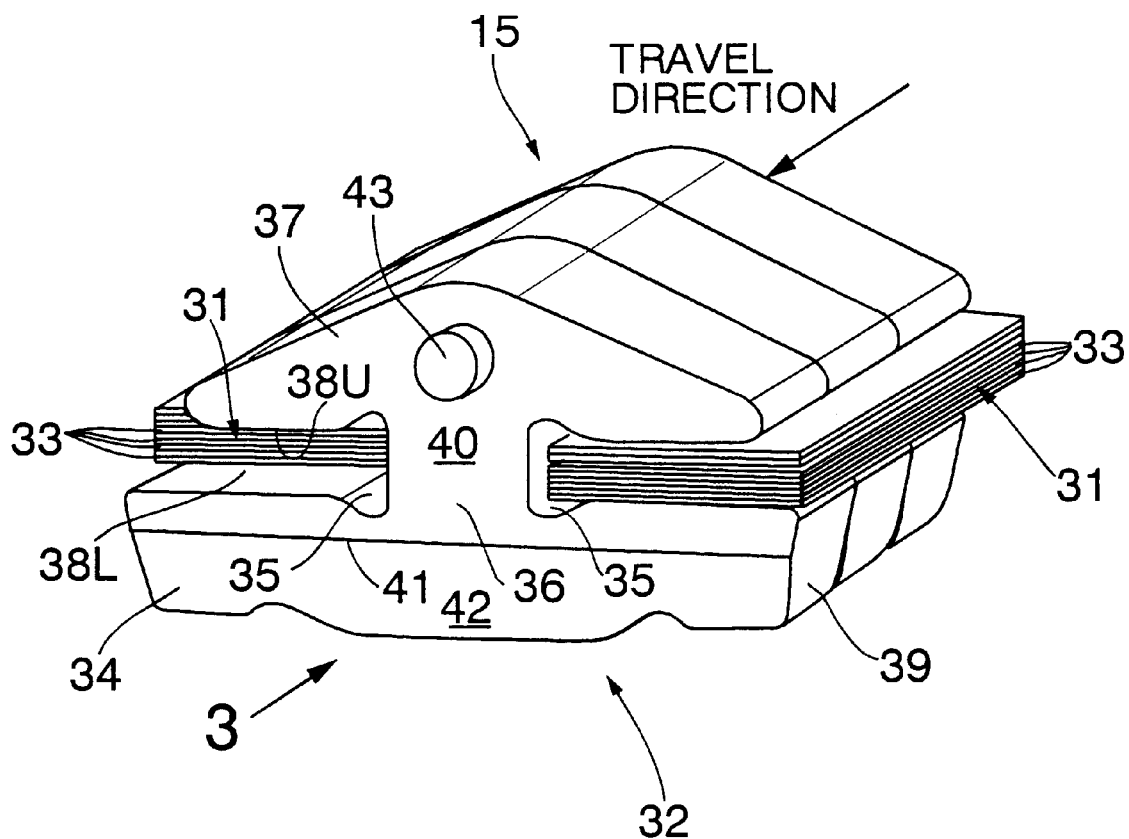

BELT FOR CONTINUOUSLY VARIABLE TRANSMISSION

BACKGROUND OF THE INVENTION

1. Field of the Invention

The present invention relates to a belt for a continuously variable transmission, which comprises a metal ring assembly formed of a plurality of endless metal rings laminated one on another, and a large number of metal elements each having a ring slot into which said metal ring assembly is fitted, the belt being wound around a drive pulley and a driven pulley for transmitting a driving force between both the pulleys.

2. Description of the Related Art

There are metal belts for continuously variable transmissions known from Japanese Patent Publication Nos. 57-23820, 3-1537 and 5-48364, in which a saddle face of each of metal elements supporting an inner peripheral surface of an endless metal ring assembly is crowned, and the metal ring assembly is centered to a central portion of the saddle face, thereby preventing a reduction in durability caused by the contact of opposite ends of the metal ring assembly with portions other than the saddle face of the metal element and a V-face of a pulley.

When the metal belt is wound around the pulley, the metal ring assembly is curved into an arcuate shape about a pulley shaft and for this reason, a tensile stress is generated on an outer peripheral surface of each of the metal rings constituting the metal ring assembly. At this time, if the saddle face of the metal element has no crowning, the tensile stress on the outer peripheral surface of the metal ring is uniform in a widthwise direction of the metal ring. However, if the saddle face of the metal element is crowned, the cross-sectional shape of the metal ring is curved along the shape of the saddle face and hence, the tensile stress on the outer peripheral surface of the metal ring is large at the widthwise central portion which is stretched strongly, and small at the widthwise opposite ends which is stretched weakly. In an area where the metal belt is wound around the pulley, the tensile stress on the outer peripheral surface of the metal ring varies in the widthwise direction, and in a straight chord between both the pulleys, the tensile stress on the outer peripheral surface of the metal ring is uniform in the widthwise direction. That is, the tensile stress varies periodically accompanying the rotating travel of the metal belt, which causes a reduction in fatigue life of the metal ring. This tendency is significant as the width of the metal ring is increased and as the crowning height is increased, which becomes a factor to hinder an increase in driving force transmitting capacity of the belt type continuously variable transmission.

SUMMARY OF THE INVENTION

The present invention has been accomplished with the above circumstances in view, and it is an object of the present invention to extend the fatigue life of the metal rings by making uniform a tensile stress on an outer peripheral surface of the metal ring in a widthwise direction in a belt including metal elements each having a crowned saddle face.

To achieve the above object, according to a first feature of the present invention, there is provided a belt for a continuously variable transmission, which comprises a metal ring assembly formed of a plurality of endless metal rings laminated one on another, and a large number of metal elements each having a ring slot into which said metal ring assembly is fitted, said belt being wound around a drive pulley and a driven pulley for transmitting a driving force between both the pulleys, wherein the metal rings and a saddle face of the ring slot supporting the innermost metal ring each have a crowning, and a crowning radius of the metal rings is set smaller than a crowning radius of the saddle face.

With the above arrangement, the metal ring assembly can be centered to a central portion of the saddle face by crowning the saddle face of each of the metal elements, whereby the metal ring assembly can be prevented from interfering with the other portions of the metal element and the pulley and thus, the durability of the metal ring assembly can be enhanced. The crowning radius of the metal ring is set smaller than the crowning radius of the saddle face and hence, a difference between a tensile stress at a central portion of the metal ring and a tensile stress at opposite ends of the metal ring can be reduced, to thereby alleviate a reduction in durability of the metal ring assembly. Thus, even if the width of the metal ring is increased, the durability can be secured, which can contribute to an increase in driving force transmitting capacity of the belt type continuously variable transmission.

BRIEF DESCRIPTION OF THE DRAWINGS

FIG. 2 is a partial perspective view of a metal belt.

DESCRIPTION OF THE PREFERRED EMBODIMENT

The mode for carrying out the present invention will now be described by way of an embodiment of the present invention shown in the accompanying drawings.

FIGS. 1 to 6 show an embodiment of the present invention.

Figure 1:
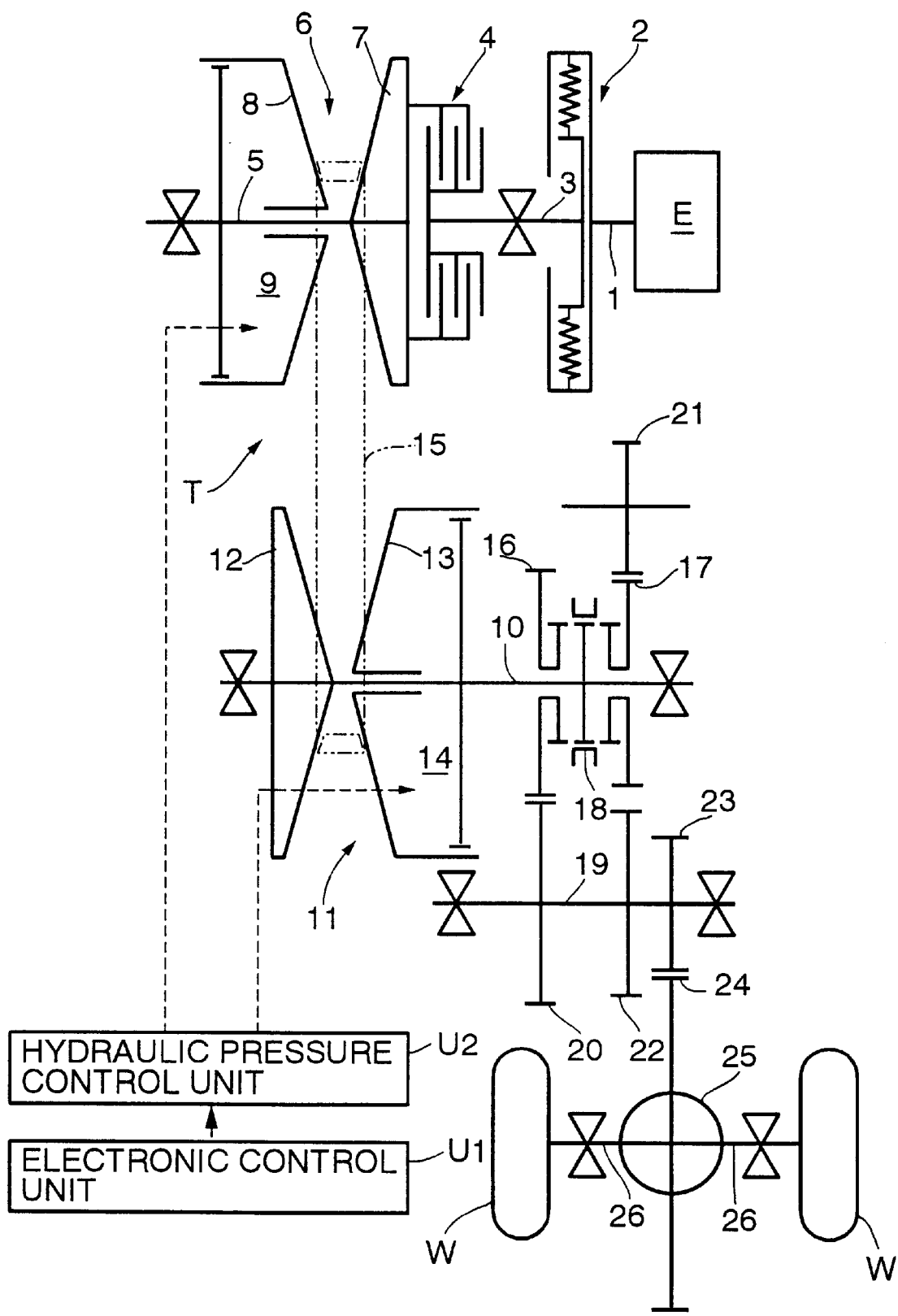
FIG. 1 is a skeleton illustration of a power transmitting system for a vehicle equipped with a continuously variable transmission.

FIG. 1 schematically shows the structure of a metal belt type continuously variable transmission T mounted on an automobile. An input shaft 3 connected to a crankshaft 1 of an engine E through a damper 2 is connected to a driving shaft 5 of the metal belt type continuously variable transmission T through a starting clutch 4. A drive pulley 6 provided on the driving shaft 5 comprises a stationary pulley half 7 secured to the driving shaft 5, and a movable pulley half 8 capable of moving toward and away from the stationary pulley half 7. The movable pulley half 8 is forced toward the stationary pulley half 7 by a hydraulic pressure applied to an oil chamber 9.

A driven pulley 11 is provided on a driven shaft 10 disposed in parallel to the driving shaft 5, and comprises a stationary pulley half 12 secured to the driven shaft 10, and a movable pulley half 13 capable of moving toward and away from the stationary pulley half 12. The movable pulley half 13 is forced toward the stationary pulley half 12 by a hydraulic pressure applied to an oil chamber 14. A metal belt 15 is wound around the drive pulley 6 and the driven pulley 11, and comprises a large number of metal elements 32 supported on a pair of left and right metal ring assemblies 31, 31 (see FIG. 2). Each of the metal ring assemblies 31, 31 comprises, for example, 12 metal rings 33 which are laminated on one another.

A forward drive gear 16 and a backward drive gear 17 are relatively rotatably supported on the driven shaft 10. The forward drive gear 16 and the backward drive gear 17 can be coupled selectively to the driven shaft 10 by a selector 18. A forward driven gear 20 meshed with the forward drive gear 16 and a backward driven gear 22 meshed with the backward drive gear 17 through a backward idling gear 21 are secured to an output shaft 19 which is disposed in parallel to the driven shaft 10.

The rotation of the output shaft 19 is input to a differential 25 through a final drive gear 23 and a final driven gear 24, and is transmitted therefrom through left and right axles 26, 26 to driven wheels W, W.

A driving force of the engine E is transmitted to the driven shaft 10 through the crankshaft 1, the damper 2, the input shaft 3, the start clutch 4, the drive shaft 5, the driven pulley 6, the metal belt 15 and the driven pulley 11. When a forward travel range is selected, the driving force of the driven shaft 10 is transmitted to the output shaft 19 through the forward drive gear 16 and the forward driven gear 20, thereby allowing the vehicle to travel forwards. When a backward travel range is selected, the driving force of the driven shaft 10 is transmitted to the output shaft 19 through the backward drive gear 17, the backward idling gear 21 and the backward driven gear 22, thereby allowing the vehicle to travel backwards.

In this metal belt type continuously variable transmission T, hydraulic pressures applied to the oil chamber 9 of the drive pulley 6 and the oil chamber 14 of the driven pulley 11 are controlled by a hydraulic pressure control unit U2 which is operated by a command from an electronic control unit U1, thereby continuously adjusting the change gear ratio. Specifically, if a hydraulic pressure applied to the oil chamber 14 of the driven pulley 11 is increased relative to a hydraulic pressure applied to the oil chamber 9 of the drive pulley 6, the grove width of the driven pulley 11 is reduced, leading to an increased effective radius, and correspondingly, the groove width of the drive pulley 6 is increased, leading to a reduced effective radius. Therefore, the change gear ratio of the metal belt type continuous variable transmission T is continuously varied toward "LOW". On the other hand, if the hydraulic pressure applied to the oil chamber 9 of the drive pulley 6 is increased relative to the hydraulic pressure applied to the oil chamber 14 of the driven pulley 11, the groove width of the drive pulley 6 is reduced, leading to an increased effective radius, and correspondingly, the groove width of the driven pulley 11 is increased, leading to a reduced effective radius. Therefore, the change gear ratio of the metal belt type continuous variable transmission T is continuously varied toward "TOP".

As shown in FIG. 2, each of the metal elements 32 formed from a metal plate by punching, includes a substantially trapezoidal element body 34, a neck 36 located between a pair of left and right ring slots 35, 35 into which the metal ring assemblies 31, 31 are fitted, and a substantially triangular ear 37 connected to an upper portion of the element body 34 through the neck 36. The metal ring assemblies 31, 31 are sandwiched between saddle faces 38L, 38L constituting radially inner edges of the ring slots 35, 35 and lower faces 38U, 38U of the ear constituting radially outer edges of the ring slots 35, 35. The innermost metal rings 33, 33 of the metal ring assemblies 31, 31 are supported on the saddle faces 38L, 38L, and clearances are defined between the outermost metal rings 33, 33 of the metal ring assemblies 31, 31 and the lower faces 38U, 38U of the ear.

A pair of pulley-abutment faces 39, 39 are formed at laterally opposite ends of the element body 34 and capable of abutting against V-faces of the drive pulley 6 and the driven pulley 11. Formed on the front and rear portions of the metal element 32 is a pair of front and rear main surfaces 40, 40 which are perpendicular to the travel direction and parallel to each other. An inclined face 42 is formed below the front main surface 40 with a laterally extending locking edge 41 located therebetween. Further, formed on the front and rear surfaces of the ear 37 are a projection 43 and a recess (not shown) for connecting the metal elements 32, 32 adjacent in the forward and backward directions.

Figure 3:
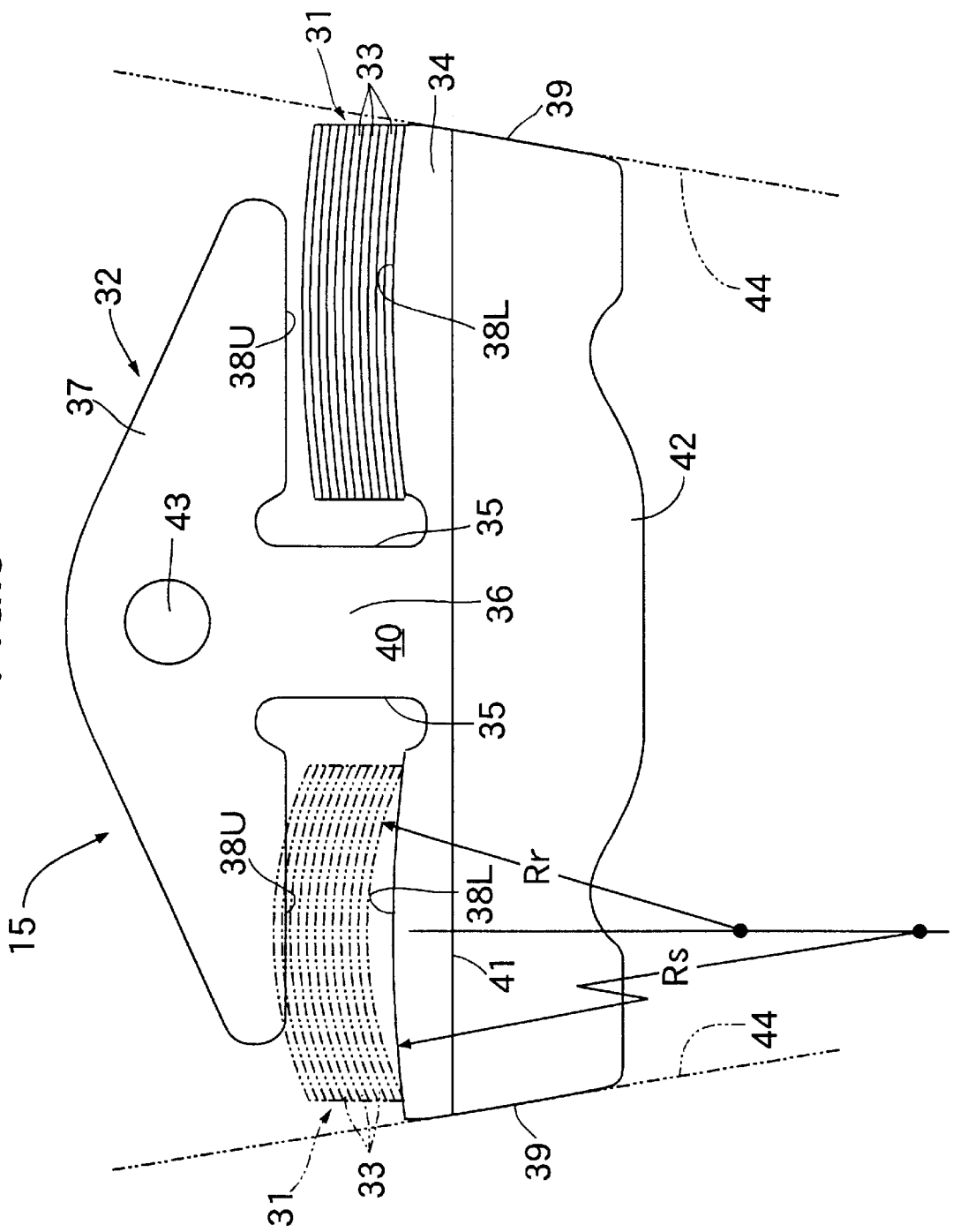
FIG. 3 is an enlarged view taken in a direction of an arrow 3 in FIG. 2.

As can be seen from FIG. 3, the saddle faces 38L, 38L of the metal element 32 are crowned, and the metal rings 33 of the metal ring assemblies 31, 31 supported on the saddle faces 38L, 38L are also crowned. As shown in the left half of FIG. 3, a crowning radius Rr of the metal rings 33 in free states shown by dashed lines is set smaller than a crowning radius Rs of the saddle face 38L. The metal rings 33 in the free states shown by dashed lines are relieved from the saddle faces 38L, 38L, but in practice, the innermost metal ring 33 is resiliently deformed by a tensile force applied to the metal ring assembly 31 to come into close contact with the saddle face 38L, and the second and subsequent metal rings 33 are also curved following the innermost metal ring 33. Therefore, the radius of curvature of all the metal rings 33 is equal to the crowning radius Rs of the saddle face 38L as shown by solid lines in the right half of FIG. 3. The crowning height of the saddle face 38L is suitable to be in a range of 50 to 70 $\mu$m, and the crowning height of the metal ring in the free state is suitable to be higher than that of the saddle face 38L by about 40 $\mu$m at the maximum.

Figure 4:
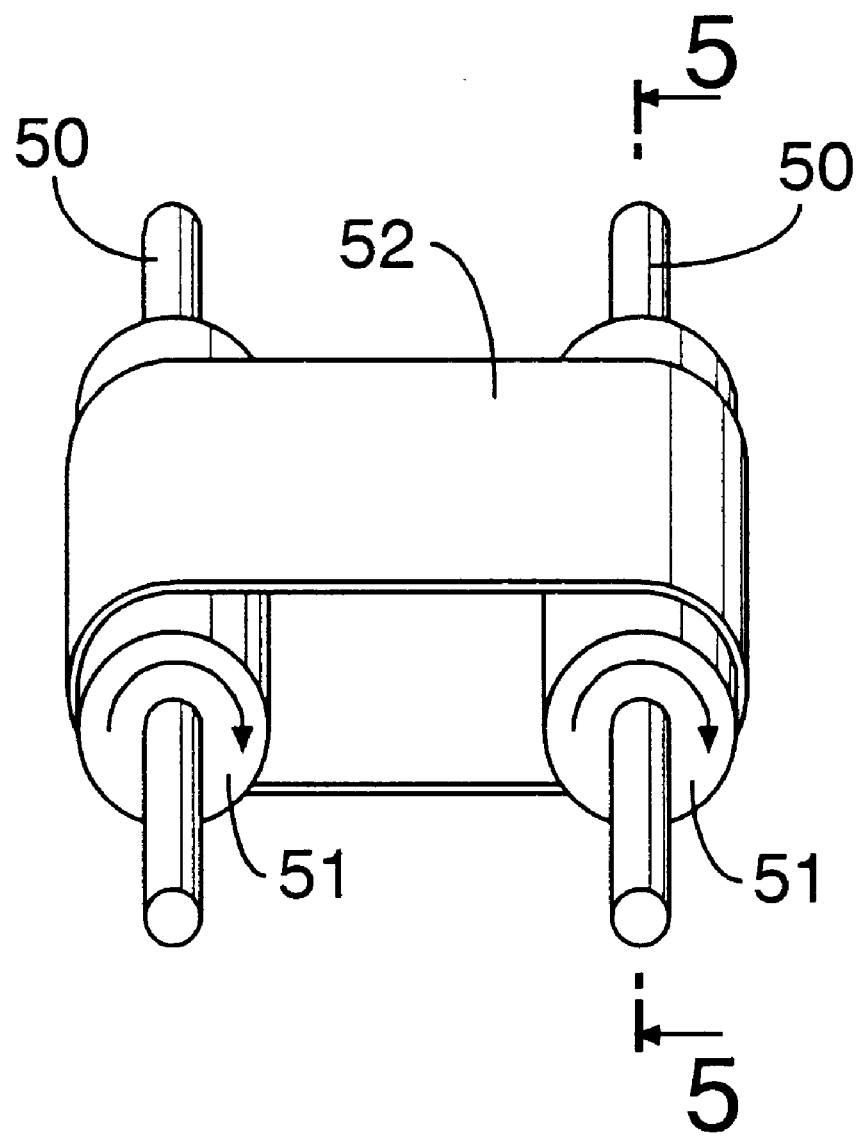
FIG. 4 is a perspective view of a test device for measuring a variation in tensile stress of a metal ring due to a crowning.
Figure 5:
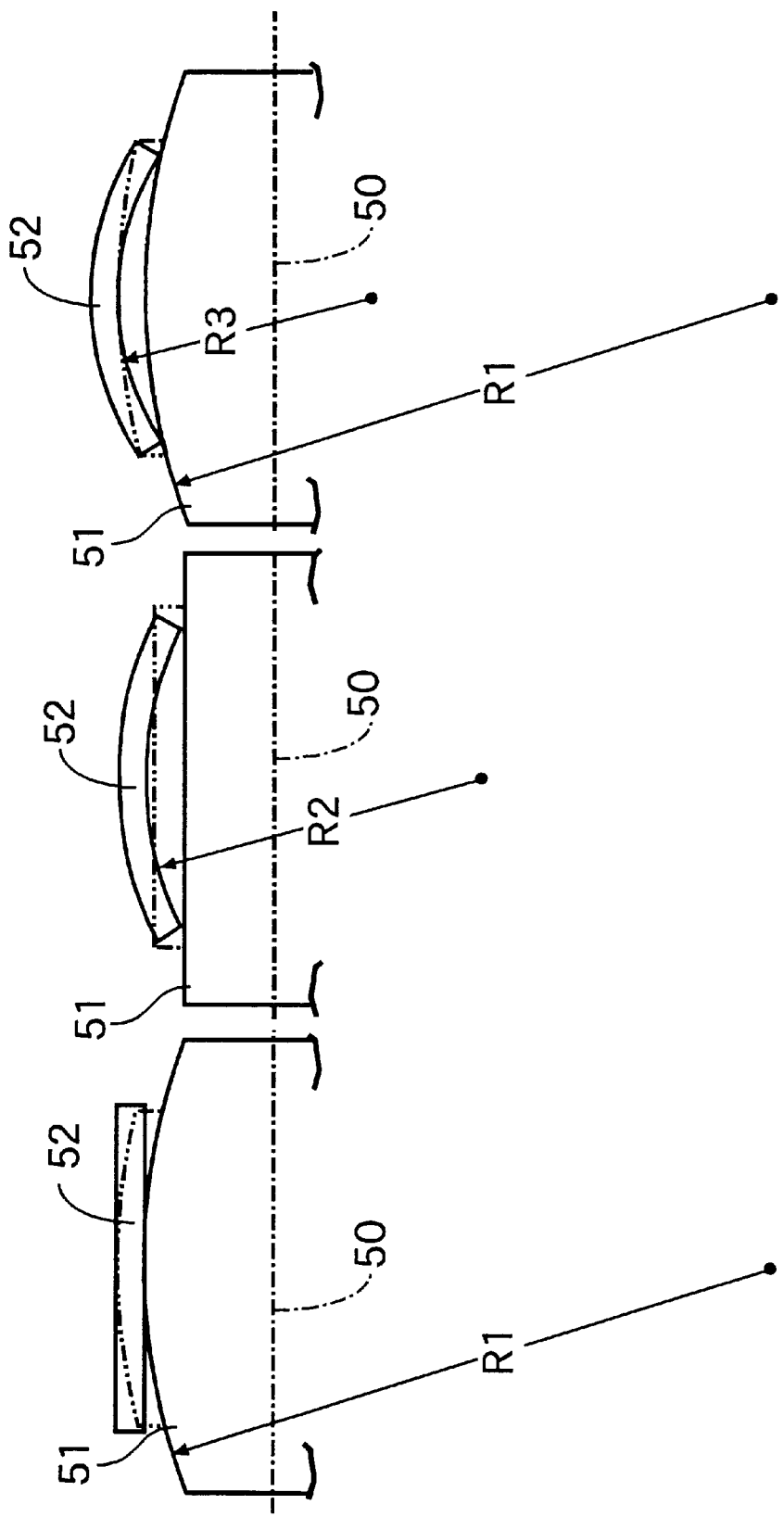
FIGS. 5A, 5B and 5C are diagrams for explaining the combination of a crowning radius of a roller and a crowning radius of the metal ring.

FIG. 4 shows a test device having a metal ring 52 around rollers 51, 51 supported on a pair of rotary shafts 50, 50, respectively. FIG. 5A shows a roller 51 having a crowning of a radius R1 and a metal ring 52 having no crowning; FIG. 5B shows a roller 51 having no crowning and a metal ring 52 having a crowning of a radius R2; and FIG. 5C shows the roller 51 having the radius R1 and a metal ring 52 having a crowning of a radius R3. In FIG. 5C, the crowning radius R3 of the metal ring 52 is set smaller than the crowning radius R1 of the roller 51. In each of FIGS. 5A to 5C, a central portion or opposite ends of the metal ring 52 are apart from the roller 51, but in practice, the metal ring 52 is resiliently deformed by a tensile force to come into close contact with the surface of the roller 51, as shown by a dashed line.

Figure 6:
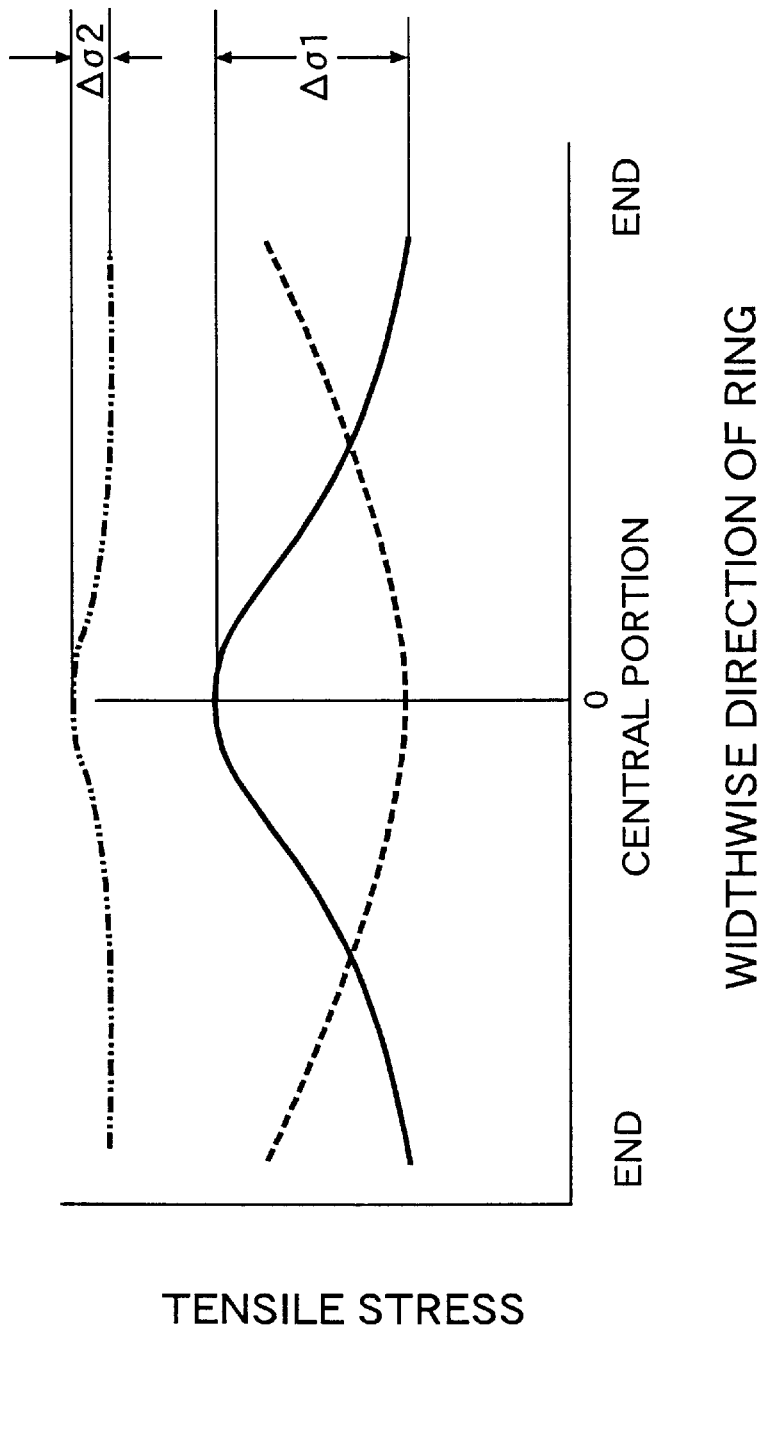
FIG. 6 is a graph showing the widthwise distribution of the tensile stress on an outer peripheral surface of the metal ring.

FIG. 6 shows the widthwise distribution of tensile stresses on a radially outer peripheral surface of the metal ring 52 corresponding to FIG. 5A. When the metal ring 52 is wound around the roller 51, the metal ring 52 is curved in an arcuate shape about the rotary shaft 50 to generate a bending stress by which a tensile stress is applied to the radially outer peripheral surface of the metal ring 52, and a compressive stress is applied to a radially inner peripheral surface of the metal ring 52. If neither the roller 51 nor the metal ring 52 has no crowning, the tensile stress on the metal ring 52 must be uniform in a widthwise direction. In this embodiment, however, because the roller 51 has the crowning, the tensile stress on the outer peripheral surface of the metal ring 52 is large at the widthwise central portion, and small at the widthwise opposite ends. A difference $\Delta\sigma 1$ between the maximum value of the tensile stress at the widthwise central portion and the minimum value of the tensile stress at the widthwise opposite ends is relatively large.

Shown in FIG. 5B is the case where the roller 51 has no crowning and the metal ring 52 is crowned with the radius R2, and the widthwise distribution of the tensile stress on the outer peripheral surface of the metal ring 52 in this case is shown by a broken line in FIG. 6. In this case, the metal ring 52 crowned is resiliently deformed along the surface of the roller 51 having no crowning and hence, the widthwise direction of the metal ring 52 is compressed, resulting in a reduced tensile stress, and the widthwise opposite ends are expanded, resulting in an increased tensile stress. The tensile stress in this case is uniform in a direction of thickness, including the outer peripheral surface of the metal ring 52.

Shown in FIG. 5C is the case where both the roller 51 and the metal ring 52 have the crowning, and the crowning radius R3 of the metal ring 52 is set smaller than the crowning radius R1 of the roller 51, and the widthwise distribution of the tensile stress on the outer peripheral surface of the metal ring 52 in this case is shown by a chain line in FIG. 6. In this case, the metal ring 52 is curved about the rotary shaft 50 of the roller 51 to generate a bending stress, and is brought into close contact with the outer peripheral surface of the roller 51 to generate a tensile stress. Therefore, the tensile stress on the outer peripheral surface of the metal ring 52 shown by the chain line is equal to a tensile stress shown by the solid line plus the tensile stress shown by the broken line.

The characteristic of a variation in tensile stress shown by the solid line and the characteristic of a variation in tensile stress shown by the broken line are reversed from each other. Therefore, the characteristic of a variation in tensile stress shown by the chain line is relatively flat, and a stress difference $\Delta\sigma 2$ which is a difference between the maximum tensile stress and the minimum tensile stress, is smaller than the stress difference $\Delta\sigma 1$. Thus, it is possible to reduce the difference $\Delta\sigma 2$ between the tensile stress at the widthwise central portion and the tensile stress at the widthwise opposite ends of the outer peripheral surface of the metal ring 52 to enhance the durability of the metal ring 52 by crowning the roller 51 at the radius R1 and crowning the metal ring 52 with the radius R3 smaller than the radius R1, as described above.

When the metal ring 52 is curved into the arcuate shape about the rotary shaft 50 of the roller 51 to generate the bending stress, the compressive stress is generated on the inner peripheral surface of the metal ring 52. However, this compressive stress is offset by the tensile stress generated by the close contact of the metal ring 52 with the surface of the roller 51 and hence, the influence of the stress on the inner peripheral surface of the metal ring 52 affecting the durability is reduced. Therefore, if the difference $\Delta\sigma 2$ between the tensile stresses on the outer peripheral surface of the metal ring 52 is reduced by the above-described technique, the durability of the metal ring 52 can be enhanced sufficiently.

With the forgoing taken into account, in the present embodiment, the crowning radius Rs of the saddle faces 38L, 38L of the metal element 32 and the crowning radius Rr of the metal rings 33 in the free state are set so that a relation, Rs>Rr is established, as shown in the left half of FIG. 3. Thus, the metal ring assemblies 31, 31 can be centered to the central portions of the saddle faces 38L, 38L by crowning the saddle faces 38L, 38L, thereby reducing the difference $\Delta\sigma 2$ between the tensile stress at the widthwise central portion and the tensile stress at the widthwise opposite ends of the outer peripheral surface of each of the metal rings 33 to further enhance the durability of the metal rings 33, while preventing a reduction in durability caused by the interference of the side edges of the metal rings 33 with the neck portion 36 and/or the V-faces 44, 44 of the pulleys 6 and 11.

As described above, according to the present invention, the metal ring assembly can be centered to the central portion of the saddle face by crowning the saddle face of each of the metal elements, whereby the metal ring assembly can be prevented from interfering with the other portions of the metal element and the pulley and thus, the durability of the metal ring assembly can be enhanced. The crowning radius of the metal ring is set smaller than the crowning radius of the saddle face and hence, the difference between the tensile stress at the central portion of the metal ring and the tensile stress at the opposite ends of the metal ring can be reduced, to thereby alleviate the reduction in durability of the metal ring assembly. Thus, even if the width of the metal ring is widened, the durability can be ensured, which can contribute to an increase in driving force transmitting capacity of the belt type continuously variable transmission.

Although the embodiment of the present invention has been described in detail, it will be understood that various modifications in design may be made without departing from the subject matter of the present invention.

What is claimed is:

1. A belt for a continuously variable transmission, which comprises a metal ring assembly formed of a plurality of endless metal rings laminated one on another, and a large number of metal elements each having a ring slot into which said metal ring assembly is fitted, said belt being wound around a drive pulley and a driven pulley for transmitting a driving force between both the pulleys, wherein the metal rings and a saddle face of the ring slot supporting the innermost metal ring each have a crowning, and a crowning radius of the metal rings in a free state is set smaller than a crowning radius of the saddle face.

* * * * *